(12) United States Patent
Baik

(10) Patent No.: US 7,535,613 B2
(45) Date of Patent: May 19, 2009

(54) SCANNING LASER DISPLAY APPARATUS USING LASER DIODE ARRAY DIRECTED TO AND CORRESPONDING WITH CONDENSING MEANS OF PLANE MIRRORS

(75) Inventor: Haing-Ju Baik, Changwon (KR)

(73) Assignee: HB Electronics Co., Ltd., Gwangju (KR)

( * ) Notice: Subject to any disclaimer, the term of this patent is extended or adjusted under 35 U.S.C. 154(b) by 22 days.

(21) Appl. No.: 11/419,195

(22) Filed: May 18, 2006

(65) Prior Publication Data
US 2007/0247690 A1    Oct. 25, 2007

(30) Foreign Application Priority Data
Apr. 21, 2006    (KR)    ............ 10-2006-0036042

(51) Int. Cl.
G02B 26/08    (2006.01)
B41J 2/455    (2006.01)

(52) U.S. Cl. ............ 359/205; 347/233; 347/256
(58) Field of Classification Search ......... 359/196–226; 347/233, 241, 243–244, 256, 258–261
See application file for complete search history.

(56) References Cited

U.S. PATENT DOCUMENTS

| | | | | |
|---|---|---|---|---|
| 5,155,615 A | * | 10/1992 | Tagawa | ............ 359/213 |
| 5,166,944 A | | 11/1992 | Conemac | |
| 5,170,181 A | | 12/1992 | Tamada | ............ 347/232 |
| 5,235,183 A | * | 8/1993 | Whiting et al. | ............ 250/236 |
| 6,154,259 A | | 11/2000 | Hargis et al. | |
| 6,239,894 B1 | * | 5/2001 | Ishibe | ............ 359/205 |
| 6,285,489 B1 | * | 9/2001 | Helsel et al. | ............ 359/291 |
| 6,346,957 B1 | * | 2/2002 | Maruyama | ............ 347/115 |
| 6,522,443 B1 | * | 2/2003 | Shahar et al. | ............ 359/212 |
| 6,594,090 B2 | * | 7/2003 | Kruschwitz et al. | ............ 359/707 |
| 6,612,703 B2 | * | 9/2003 | Lowenthal et al. | ............ 353/31 |
| 6,636,339 B2 | * | 10/2003 | Lee | ............ 359/202 |
| 6,646,744 B2 | * | 11/2003 | Pedersen et al. | ............ 356/445 |

(Continued)

FOREIGN PATENT DOCUMENTS

KR    1020040090901    10/2004

OTHER PUBLICATIONS

The Photonics.com Dictionary, "condenser," available at http://photonics.com/dictHome.aspx (accessed Oct. 24, 2007).*

*Primary Examiner*—Alessandro Amari
*Assistant Examiner*—Jennifer L. Doak
(74) *Attorney, Agent, or Firm*—IPLA P.A.; James E. Bame

(57) ABSTRACT

An improved laser display apparatus is disclosed, which comprises a LED device array in which a plurality of laser diode devices are arranged in a straight shape for thereby scanning a laser diode in accordance with an image signal inputted, with the laser diode devices being designed to generate laser light; a collimation lens which is provided at one side of the LED device array for collimating each laser light scanned from the laser diode devices in parallel in one direction; a condensing unit which is provided at one side of the collimation lens for collimating each laser light, which is collimated in one direction by the collimation lens, through one imaginary focus; and a scanning unit which reflects laser light which transmits through the condensing unit.

6 Claims, 17 Drawing Sheets

U.S. PATENT DOCUMENTS 6,804,269 B2 * 10/2004 Lizotte et al. .................. 372/9
6,865,309 B2 * 3/2005 Dho ............................ 385/15
2003/0138999 A1 * 7/2003 Tanaka ....................... 438/166
2004/0227806 A1 * 11/2004 Takakubo ................... 347/241

* cited by examiner

SCANNING LASER DISPLAY APPARATUS USING LASER DIODE ARRAY DIRECTED TO AND CORRESPONDING WITH CONDENSING MEANS OF PLANE MIRRORS

BACKGROUND OF THE INVENTION

1. Field of the Invention

The present invention relates to a laser display apparatus, and in particular to a laser display apparatus which comprises a plurality of laser diode devices for scanning laser light, and a condensing unit having a scanning unit for reflecting laser light so that a certain image is displayed on a screen, and laser light is scanned in a two-dimension method using two scanning units, with the scanning units being designed to directly project laser light generated by a laser diode array on a screen for thereby displaying images.

2. Description of the Background Art

A projection type display apparatus such as a LCD is manufactured with a light and compact size, and a large size screen can be advantageously constituted using the same. However, a manufacturing price is high, and light loss increases due to the use of a polarization panel. A laser display apparatus has been developed as a new apparatus based on a light scanning method which uses a laser diode as a light source.

FIG. 1 is a view illustrating a construction of a conventional laser display apparatus.

As shown therein, a laser display apparatus comprises first through third lasers 11, 21 and 31 for generating and scanning red, green and blue wavelength lights, a light integration optical system 40 for integrating the lights scanned by the first through third lasers 11, 21 and 31, and a light scanning unit 50.

The light integration optical system 40 comprises a full reflection mirror 41 for reflecting red wavelength light scanned by the third laser 31, and first and second two-color mirrors 43 and 45. The first two-color mirror 43 transmits the light reflected by the full reflection mirror 41 and reflects the green wavelength light scanned by the second laser 21.

With the above operation, the reflected green wavelength light and red wavelength light are integrated with each other. The second two-color mirror 45 reflects the light inputted from the first two-color mirror 43 and transmits the blue wavelength light inputted from the first laser 11, so that the light integrated with red, green and blue colors transmits through the same path.

The first through third condensing lenses 13, 23 and 33 and the first through third light modulators 15, 25 and 35 are arranged at the transmission path of the light scanned by the first through third lasers 11, 21 and 31. Here, the light scanning unit 50 includes a rotation polygon mirror 51 which linearly scans light inputted, and a galvano mirror 55 which scans the linearly scanned light again based on the plane shape scanning method. The light scanning unit 50 scans the light integrated by the light integration optical system 40 based on the plane shape scanning method for thereby displaying images.

However, since the sizes of each laser 11, 21 and 31, which form the conventional laser display apparatus, is too large, such lasers cannot be adapted to a small size display apparatus which is engaged at a cellular phone or a portable watch. For example, since the width D1 between one end of the first laser 11 and the third laser 31 is about 450 mm, it is impossible to produce a small size display apparatus.

As the prior arts of the present invention, there are the U.S. Pat. No. 5,166,944 (Advanced laser technologies) and the U.S. Pat. No. 6,154,259 (Photera Technologies).

As another prior art of the present invention, a rotation polygon mirror, which is used at a scanning unit of a laser display apparatus, is constituted by attaching multiple mirrors at a side of the circular member. In the U.S. Pat. No. 6,154,259, 1350 micro laser arrays are used as the R, G and B light sources. As shown in FIG. 2, multiple polygon mirrors having different tilted angles are disclosed. As shown in FIG. 2, the rotation polygon mirror 70 is constituted by attaching a plurality of tilted mirrors having constant tilted angles in the direction of a center axis 71. In the U.S. Pat. No. 6,154,259, since the polygon mirrors 72 having different tilted angles are constituted so that the tilted angles of the neighboring mirrors are getting more different, whereby the production of the same is very difficult and the production cost is very high.

In the Korean patent laid-open No. 2004-90901 (image display apparatus having a two-dimension light scanning apparatus), there is disclosed an image display apparatus which has a two-dimension light scanning apparatus which scans light by deflecting light in a two-dimension method using two scanning units. However, the above image display apparatus uses a single laser light source, so that the time required for expressing pixels during a horizontal scanning operation is too short, whereby it is impossible to express multi-level images. In addition, the above Korean patent laid-open No. 2004-90901 should use a high power laser device.

SUMMARY OF THE INVENTION

Accordingly, it is an object of the present invention to provide a laser display apparatus which overcomes the problems encountered in the conventional art.

It is another object of the present invention to provide a laser display apparatus which has a condensing unit in which a plurality of laser diode devices are arranged in at least one row.

It is further another object of the present invention to provide a laser display apparatus which is provided with a condensing unit for achieving a constant aspect ratio of an image projected on a screen even when a screen is positioned at a certain position from a light source.

It is still further another object of the present invention to provide a laser display apparatus which can implement a high resolution display apparatus by coupling two scanning units and reflecting a laser beam based on a two-dimension method.

It is still further another object of the present invention to provide a laser display apparatus which can obtain a constant aspect ratio of an image irrespective of a distance between a light source and a screen and an optimum image focus on a screen.

To achieve the above objects, there is provided an improved laser display apparatus, comprising a LED (Light Emitting Diode) device array in which a plurality of laser diode devices are arranged in a straight shape for thereby scanning a laser diode in accordance with an image signal inputted, with the laser diode devices being designed to generate laser light; a collimation lens which is provided at one side of the LED device array for collimating each laser light scanned from the laser diode devices in one direction; a condensing unit which is provided at one side of the collimation lens for collimating each laser light, which collimates in one direction by the collimation lens, through one imaginary focus; and a scanning unit which reflects laser light which transmits through the condensing unit.

The laser diode devices provided at the LED device array scan laser light integrated with red, green and blue colors.

The LED device array is formed of a very small laser diode wafer or a chip in a rod shape.

The condensing unit is a convex lens or a concave lens so that a laser light, which is collimated by the collimation lens, is converged at one imaginary focus.

The condensing unit is formed of a plurality of plane mirrors corresponding to laser lights which are collimated by the collimation lens, and the plane mirrors are installed so that each laser light is converged at one imaginary focus.

The scanning unit is formed of a rotation polygon mirror or a galvano mirror which linearly reflects laser light scanned from the LED device array.

There is further provided an f-θ lens provided at one side of the scanning unit for allowing a moving speed in left and right directions of the laser light reflected by the scanning unit and scanned on a plane screen to be constant.

The rotation polygon mirror has a rotating polygon column shape, with a scanning mirror being disposed at an outer surface of the rotation polygon mirror for thereby reflecting laser light.

In the present invention, since the color laser display can be manufactured in a very small size, the present invention may be well adapted to a small size portable device such as a cellular phone or a wristwatch.

To achieve the above objects, in a laser display apparatus which includes a LED (Light Emitting Diode) device array in which a plurality of laser diode devices are arranged in a straight direction for generating laser light for a display of an image by projecting laser generated by a laser diode on a screen, with the LED device array being designed for scanning a laser light in accordance with an image signal, a condenser lens which is provided at one side of the LED device array and allows each laser light scanned from the laser diode devices to transmit through one imaginary focus, and a scanning unit for scanning laser light which transmits through the condenser lens, there is provided a laser display apparatus having a scanning unit which comprises a first rotation polygon mirror which linearly reflects laser light scanned from the LED device array; a swing actuator which is installed in a vertical direction with respect to a rotation shaft of the first rotation polygon mirror; and a controller which synchronically controls the first rotation polygon mirror and the swing actuator.

The scanning unit according to another embodiment of the present invention includes a first rotation polygon mirror which linearly reflects laser light scanned from the LED device array; a second rotation polygon mirror which is installed in a vertical direction with respect to a rotation shaft of the first rotation polygon mirror; and a controller which synchronically controls the first rotation polygon mirror and the second rotation polygon mirror. The rotation polygon mirror has a rotating polygon column shape, with a scan mirror being disposed at an outer surface of the rotation polygon mirror.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The preferred embodiments of the present invention will be described with reference to the accompanying drawings.

Figure 1:
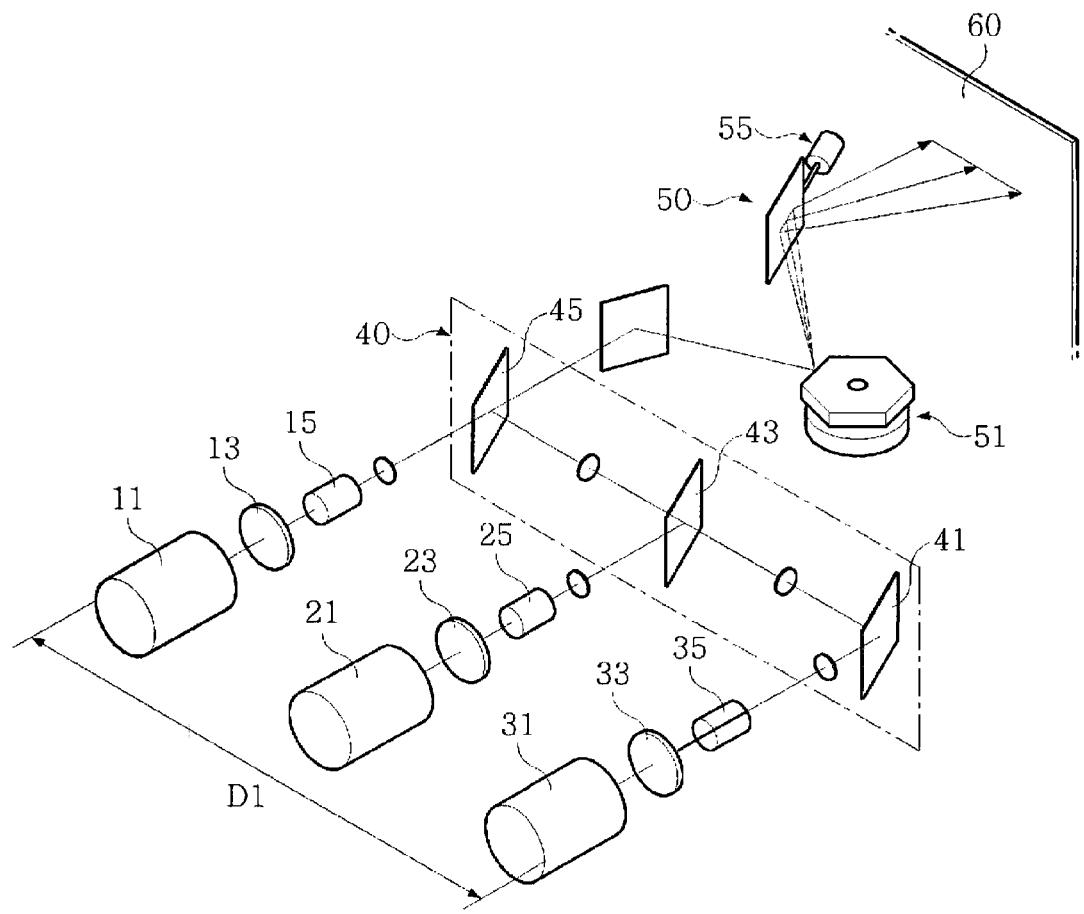
FIG. 1 is a view illustrating a construction of a conventional laser display apparatus.
Figure 2:
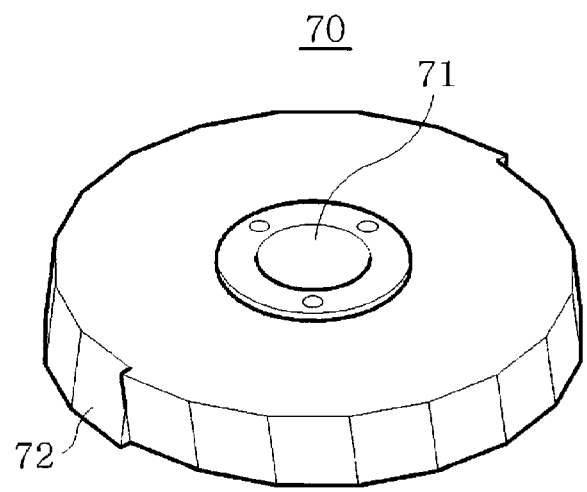
FIG. 2 is a perspective view illustrating a conventional rotation polygon mirror.
Figure 3:
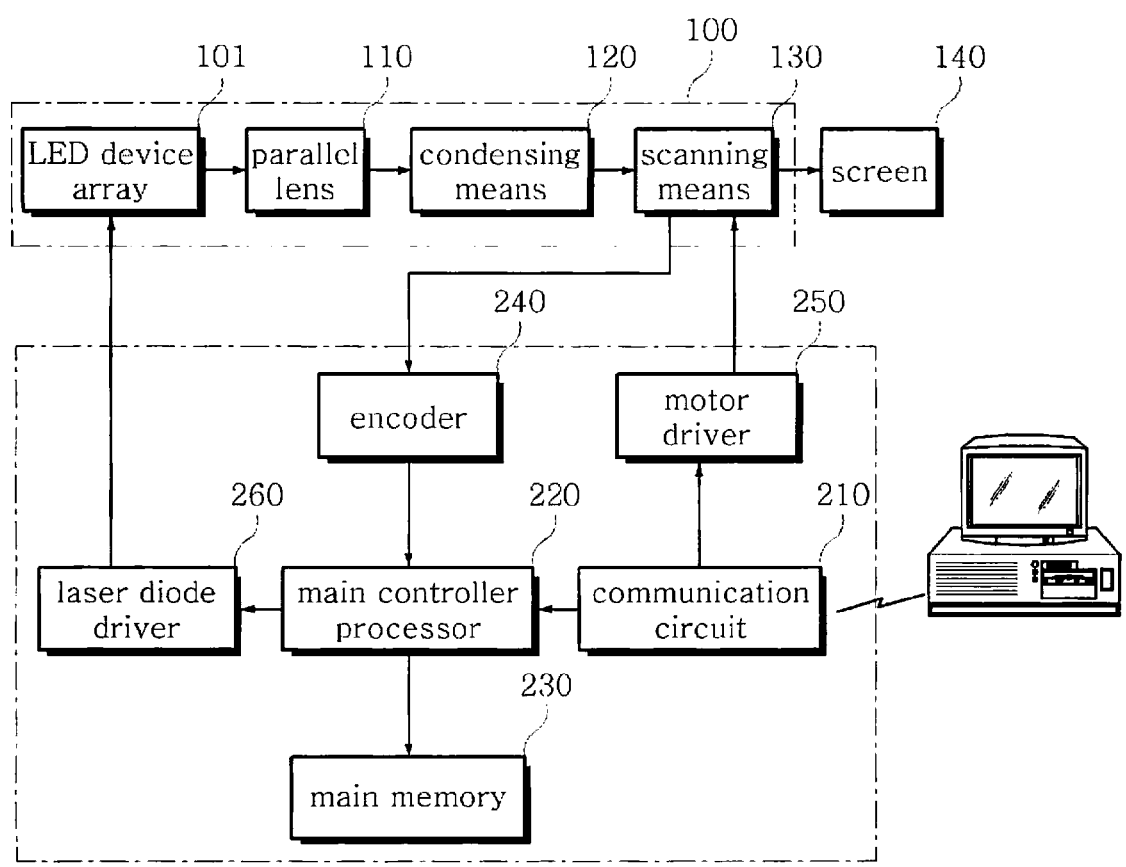
FIG. 3 is a block diagram illustrating a schematic construction of a laser display apparatus according to the present invention.
Figure 4:
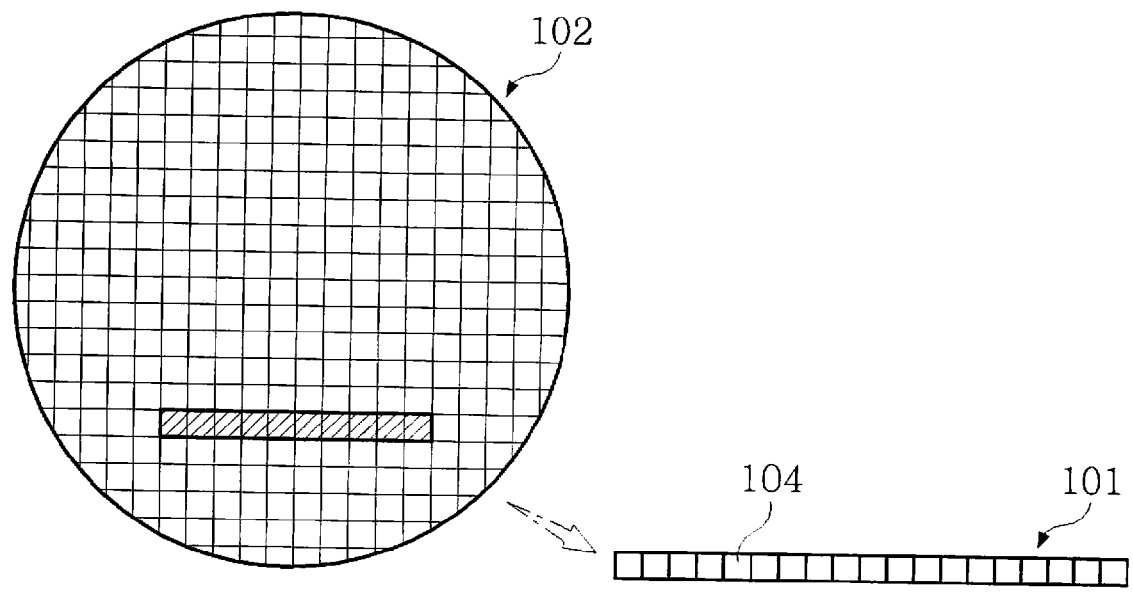
FIG. 4 is a plane view illustrating a LED (Light Emitting Diode) device array according to the present invention.
Figure 5:
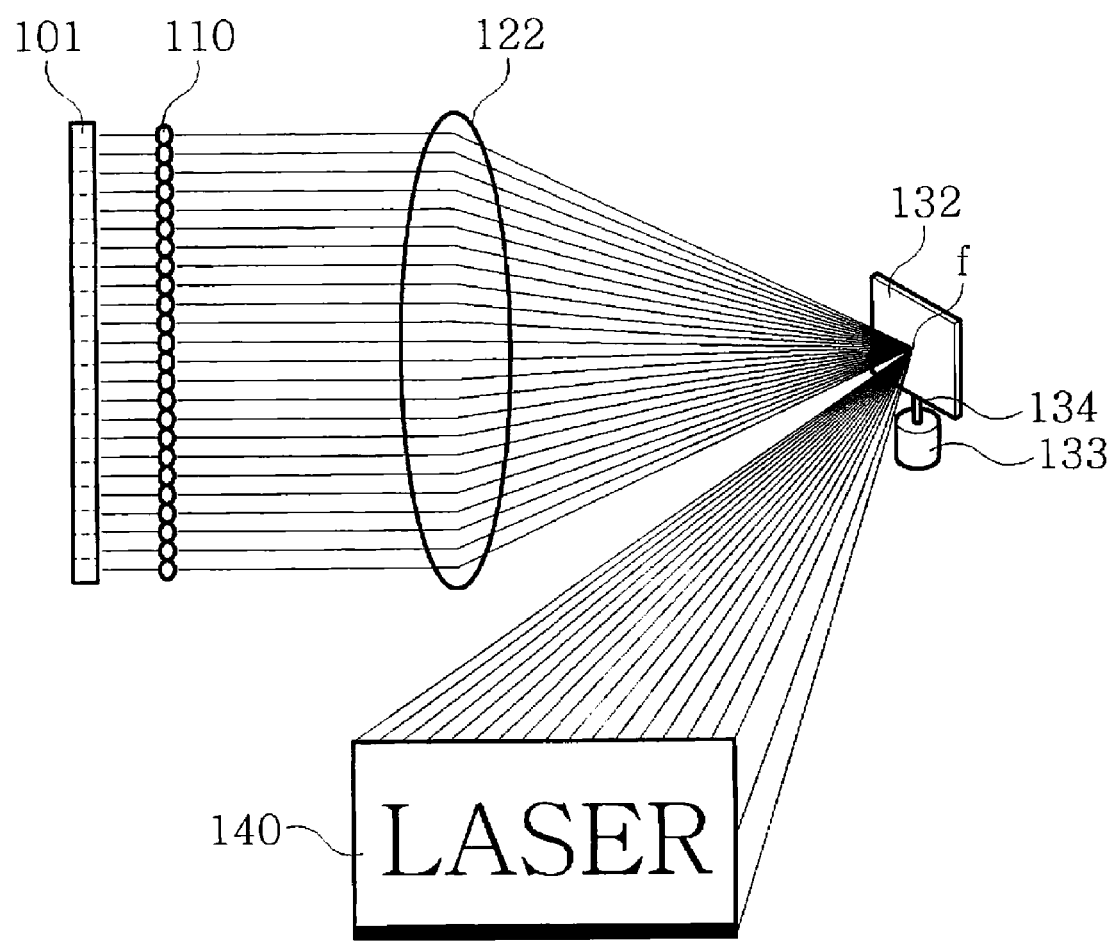
FIG. 5 is a perspective view illustrating a construction of a laser display apparatus according to a first embodiment of the present invention.
Figure 6:
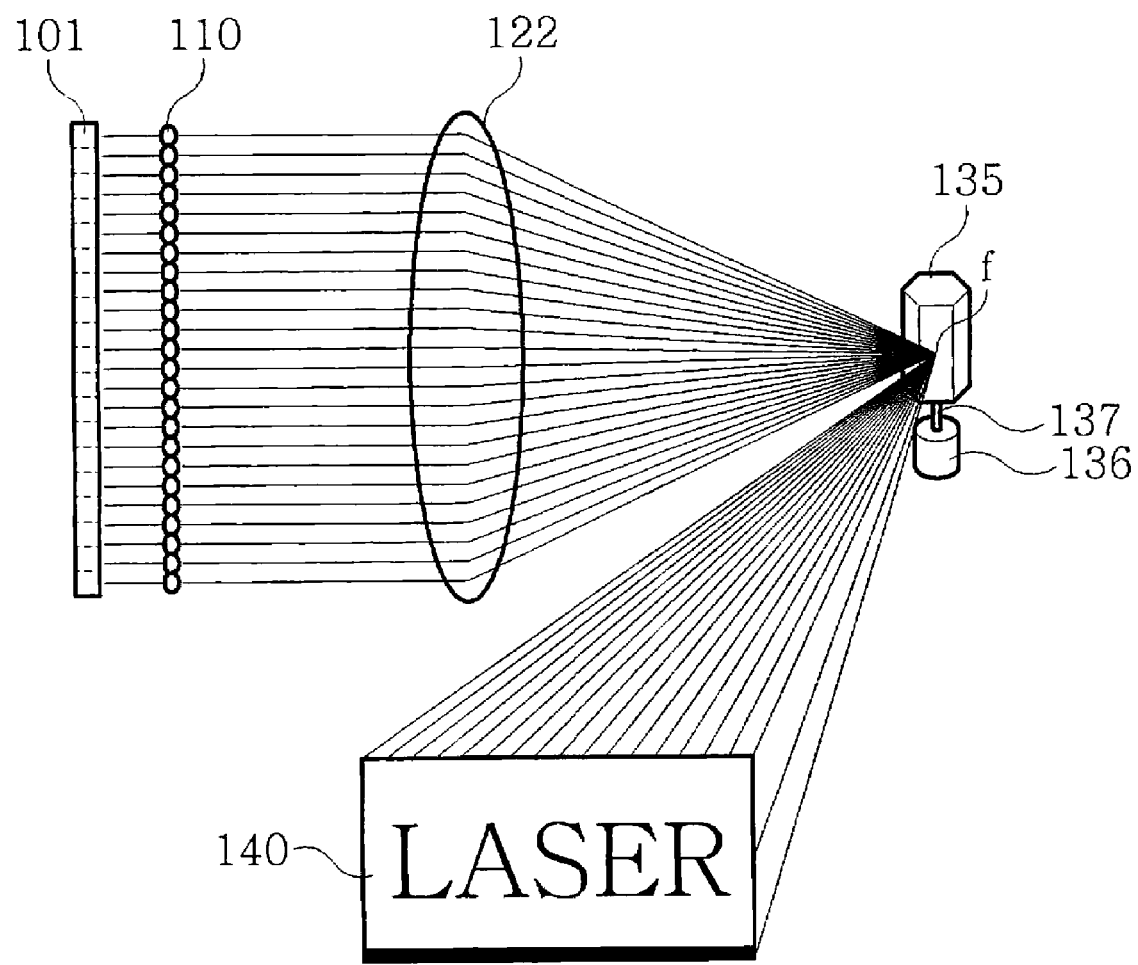
FIG. 6 is a perspective view illustrating a constriction of a laser display apparatus according to a second embodiment of the present invention.
Figure 7:
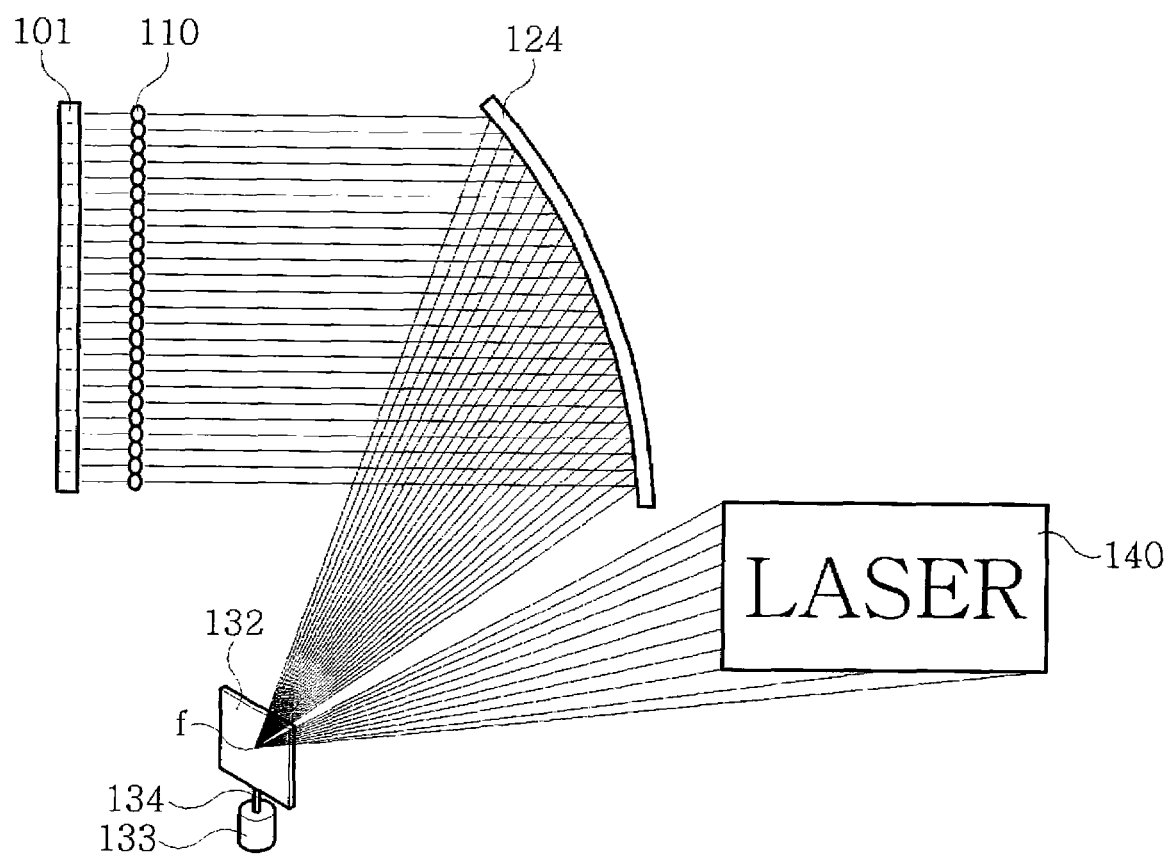
FIG. 7 is a perspective view illustrating a constriction of a laser display apparatus according to a third embodiment of the present invention.
Figure 8:
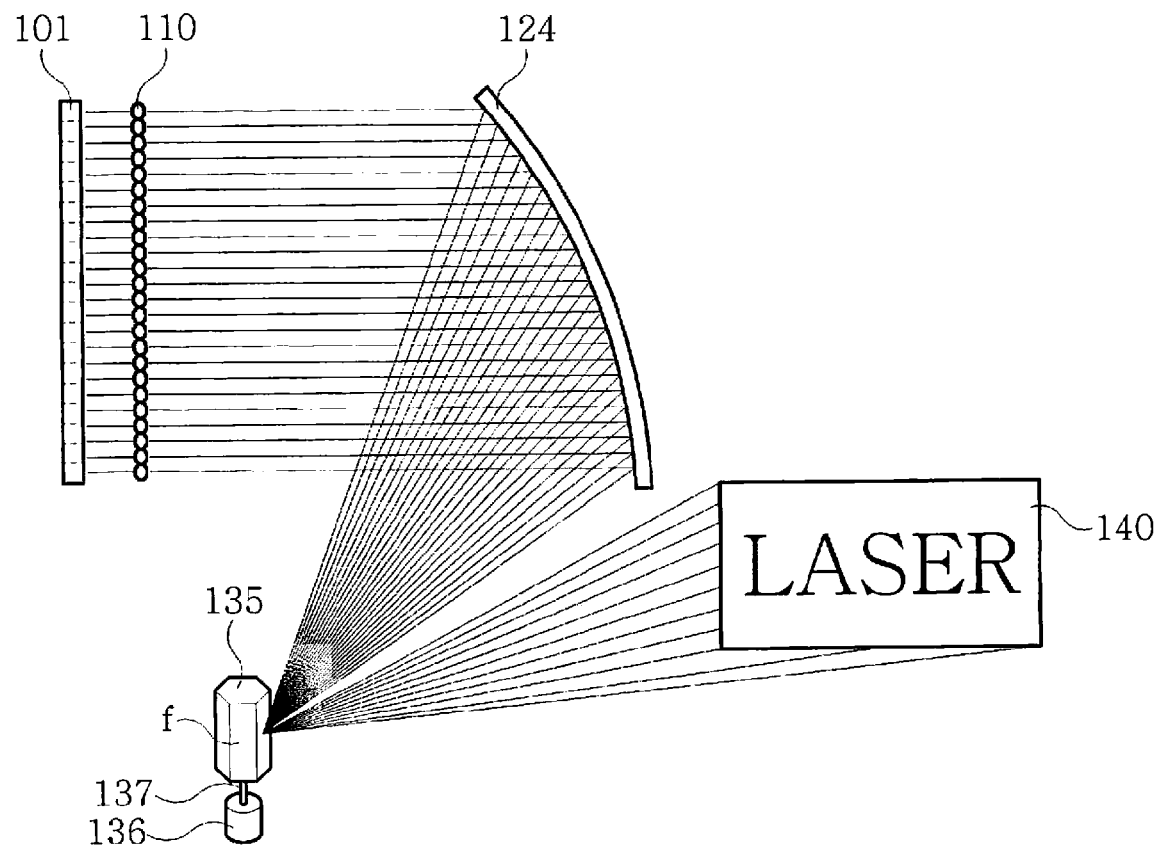
FIG. 8 is a perspective view illustrating a constriction of a laser display apparatus according to a fourth embodiment of the present invention.
Figure 9:
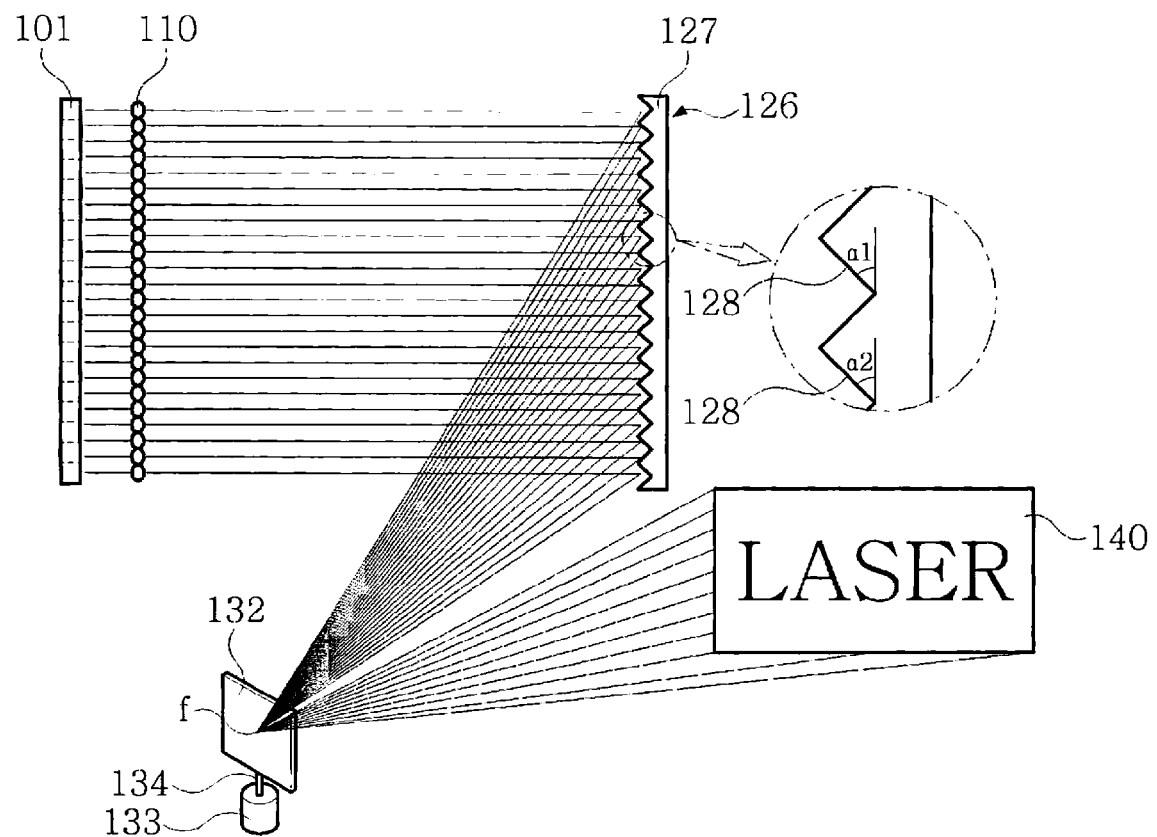
FIG. 9 is a perspective view illustrating a constriction of a laser display apparatus according to a fifth embodiment of the present invention.
Figure 10:
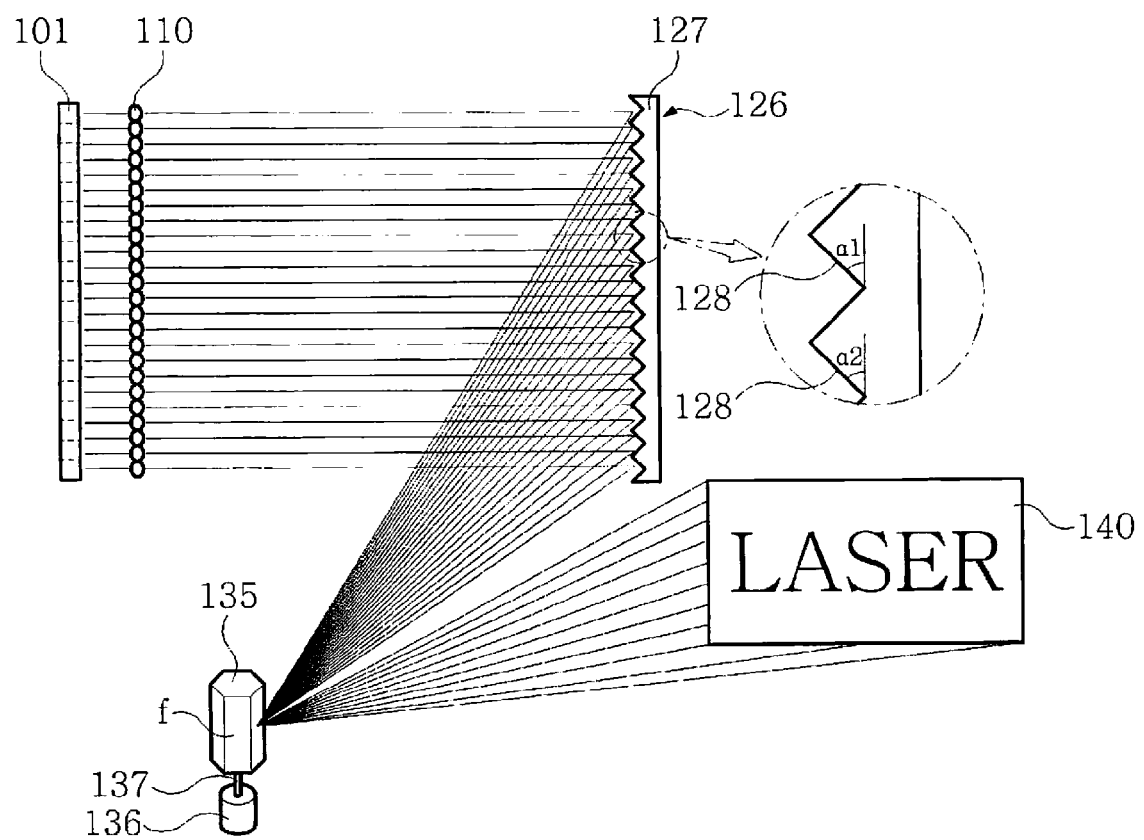
FIG. 10 is a perspective view illustrating a constriction of a laser display apparatus according to a sixth embodiment of the present invention.
Figure 11:
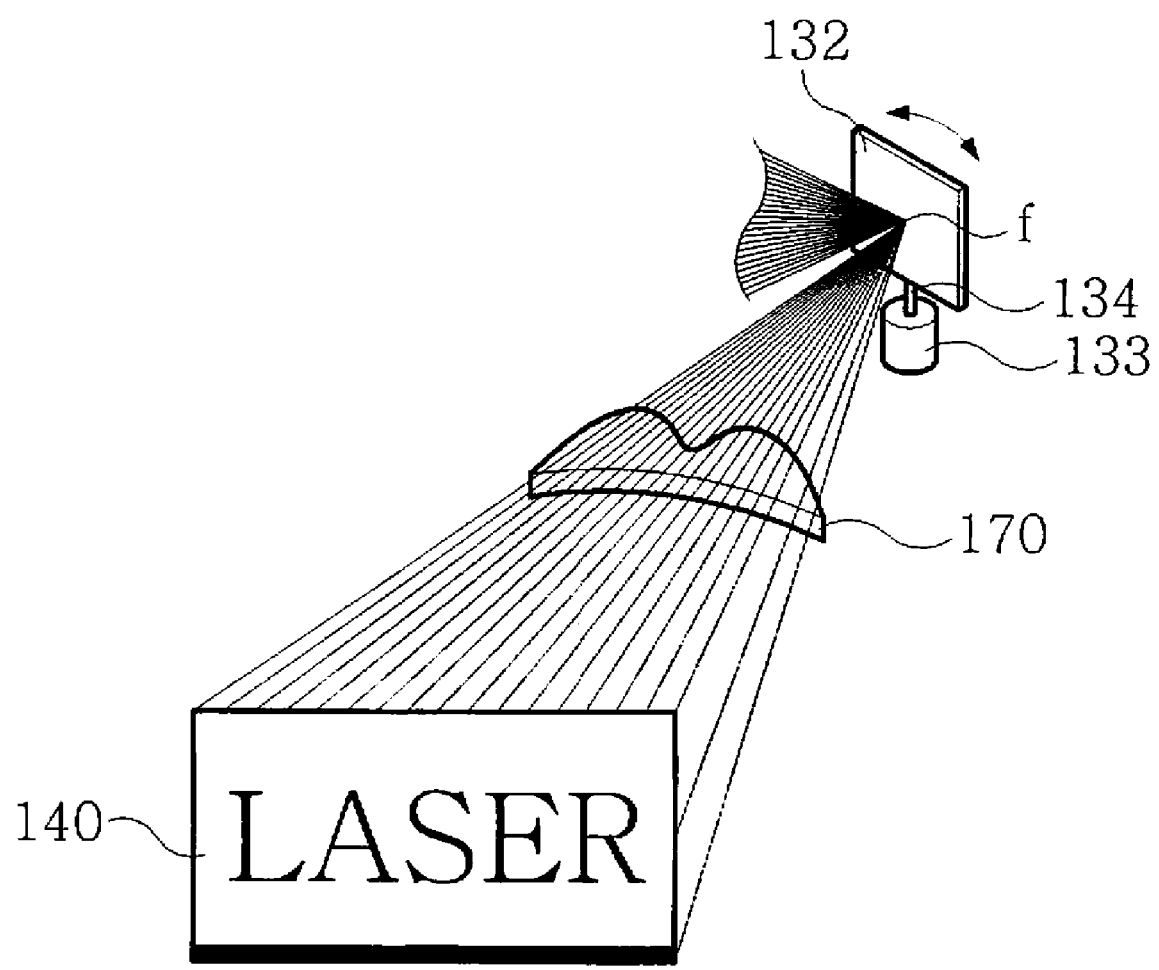
FIG. 11 is a perspective view illustrating a constriction of a laser display apparatus according to a seventh embodiment of the present invention.
Figure 12:
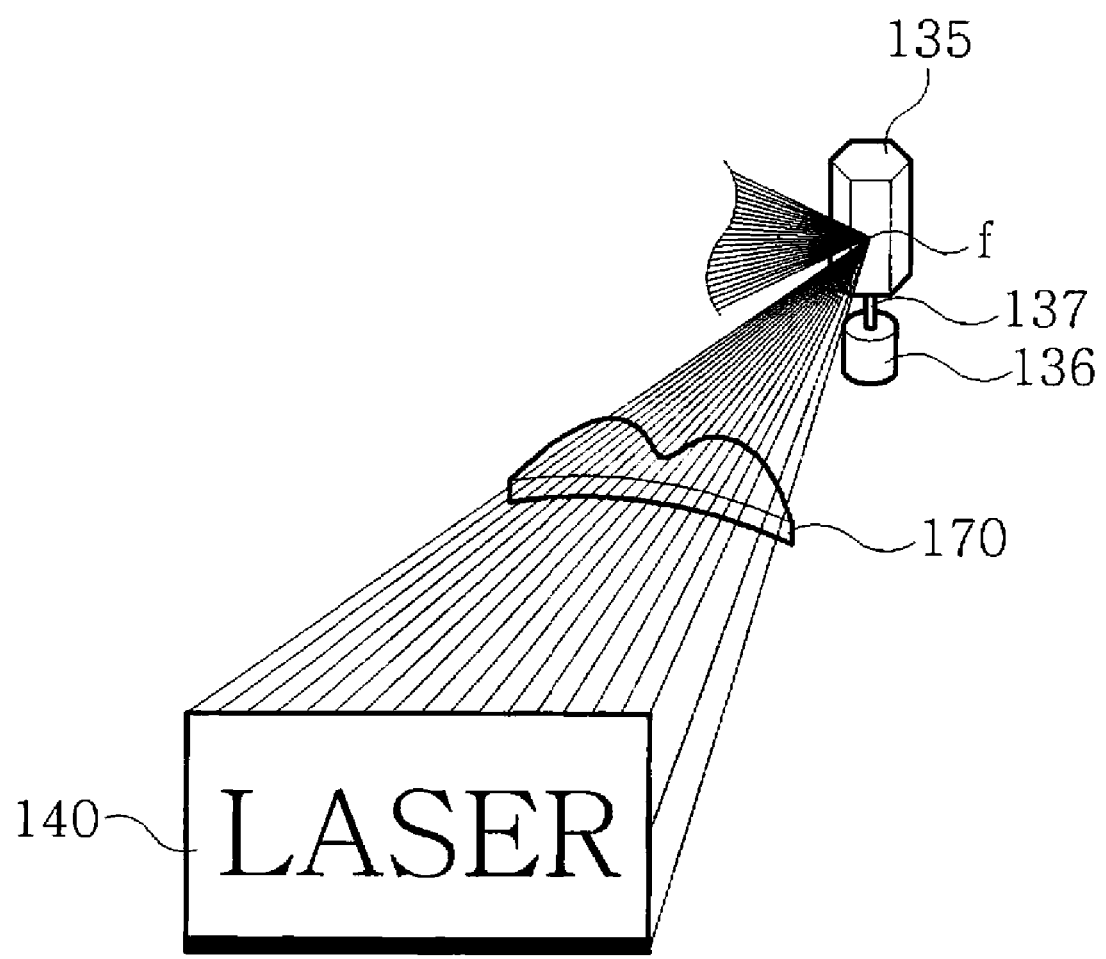
FIG. 12 is a perspective view illustrating a constriction of a laser display apparatus according to an eighth embodiment of the present invention.
Figure 13:
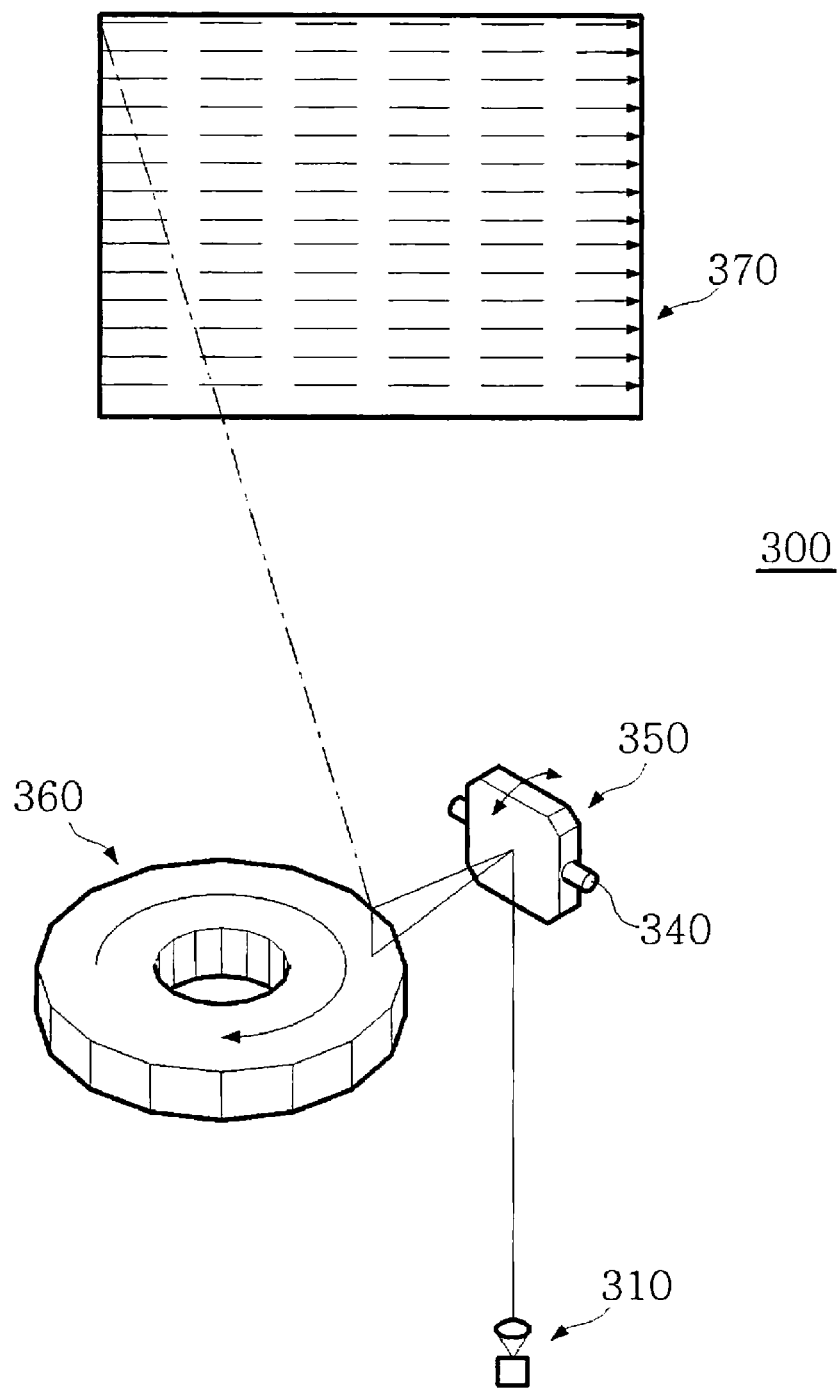
FIG. 13 is block diagram illustrating a schematic construction of a laser display apparatus according to a ninth embodiment of the present invention.
Figure 14:
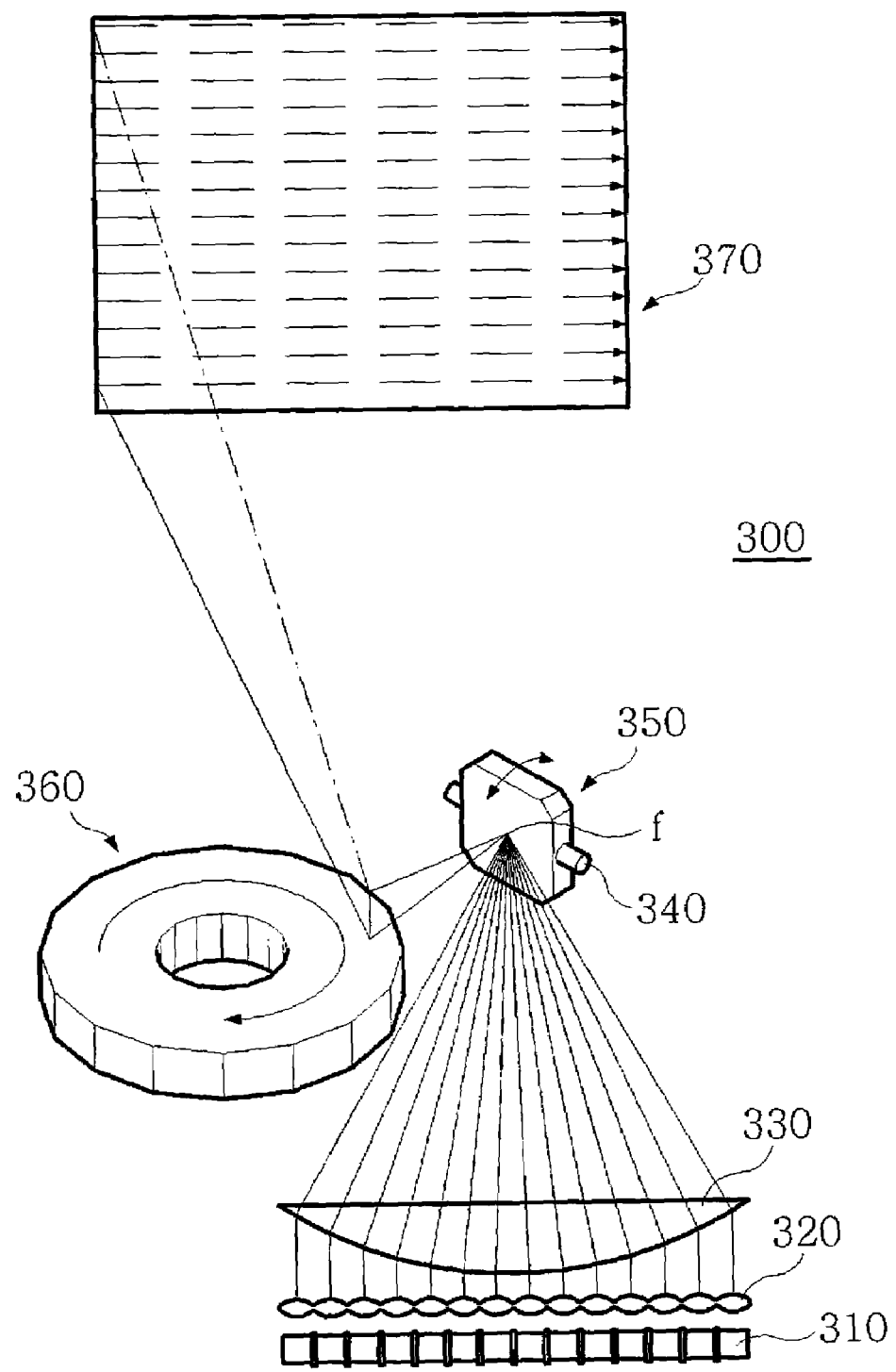
FIG. 14 is a perspective view illustrating a construction of a laser display apparatus according to a ninth embodiment of the present invention.
Figure 15:
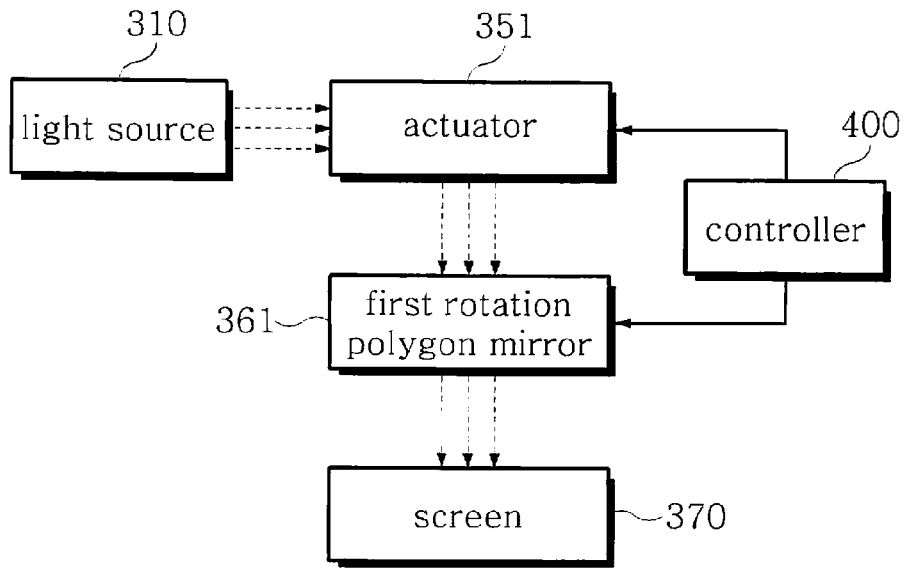
FIG. 15 is a block diagram illustrating an electric circuit of FIG. 14.
Figure 16:
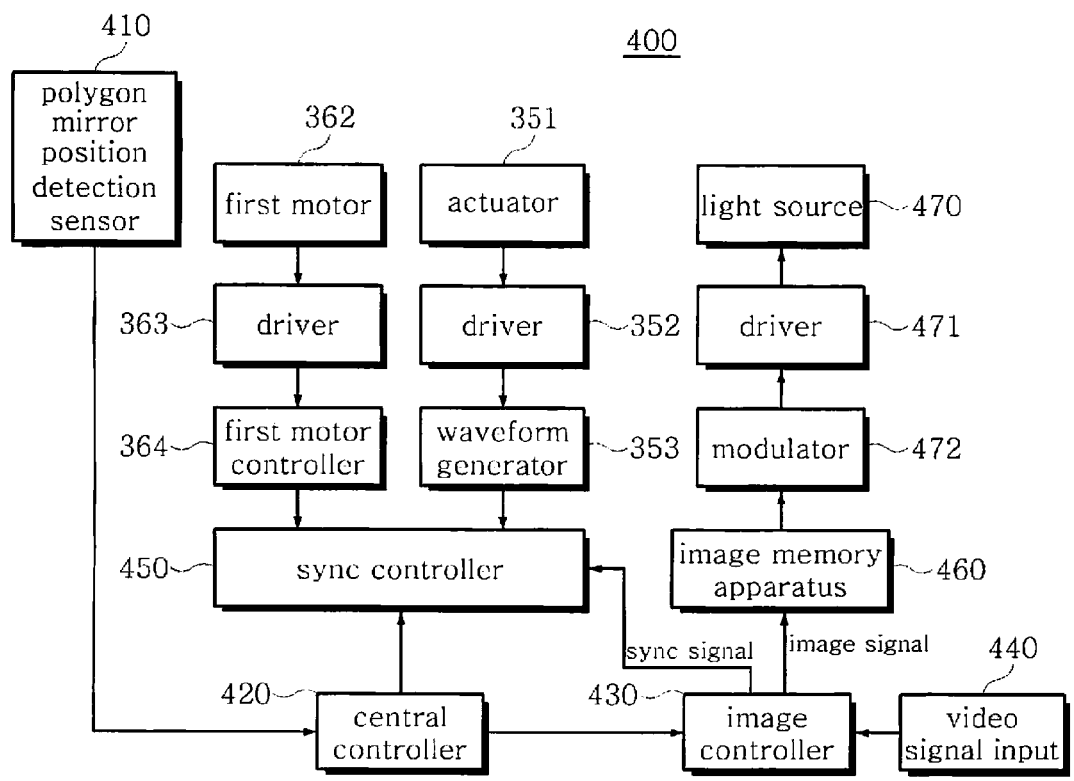
FIG. 16 is a block diagram illustrating a controller of FIG. 15.
Figure 17:
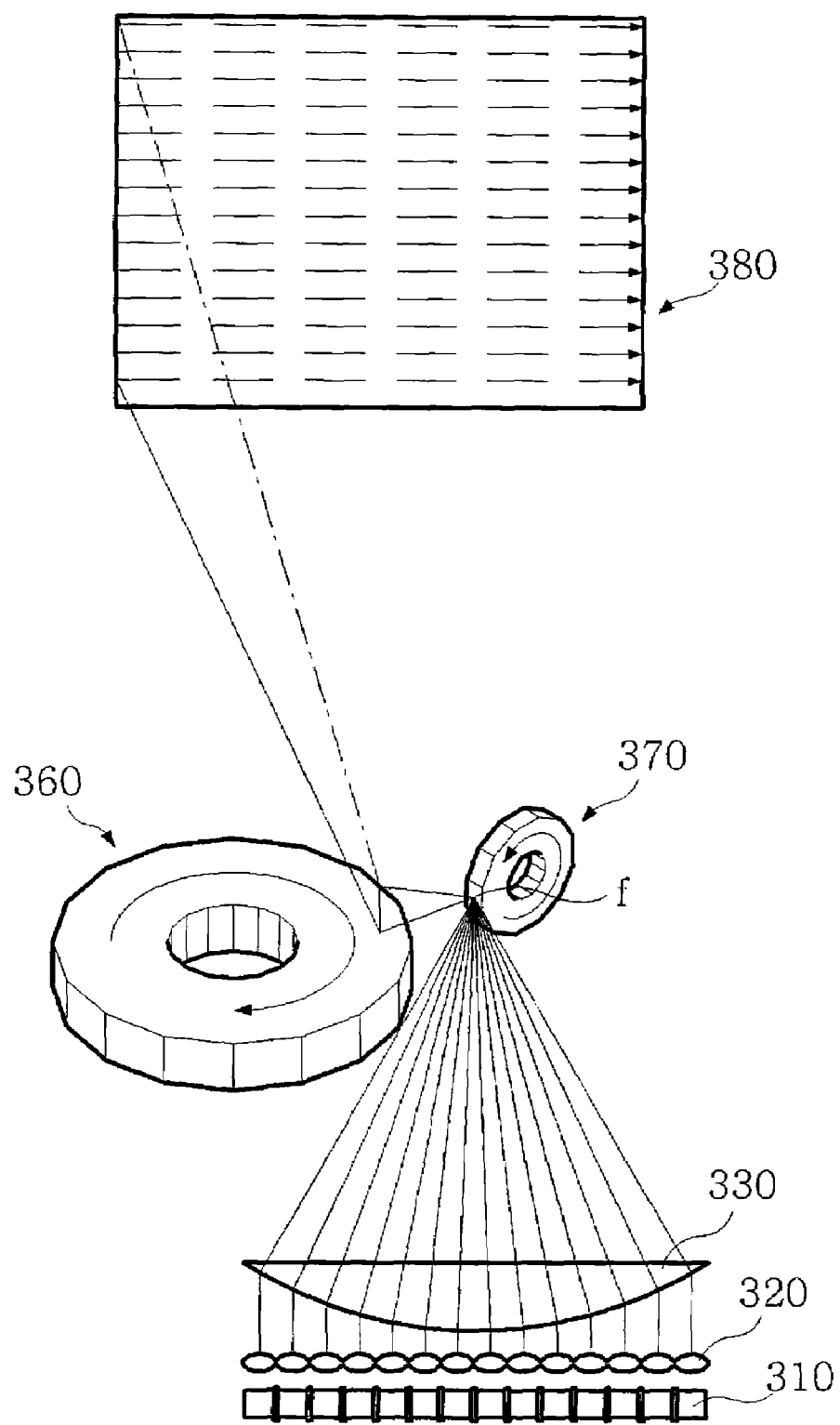
FIG. 17 is a perspective view illustrating a construction of a laser display apparatus according to a tenth embodiment of the present invention.
Figure 18:
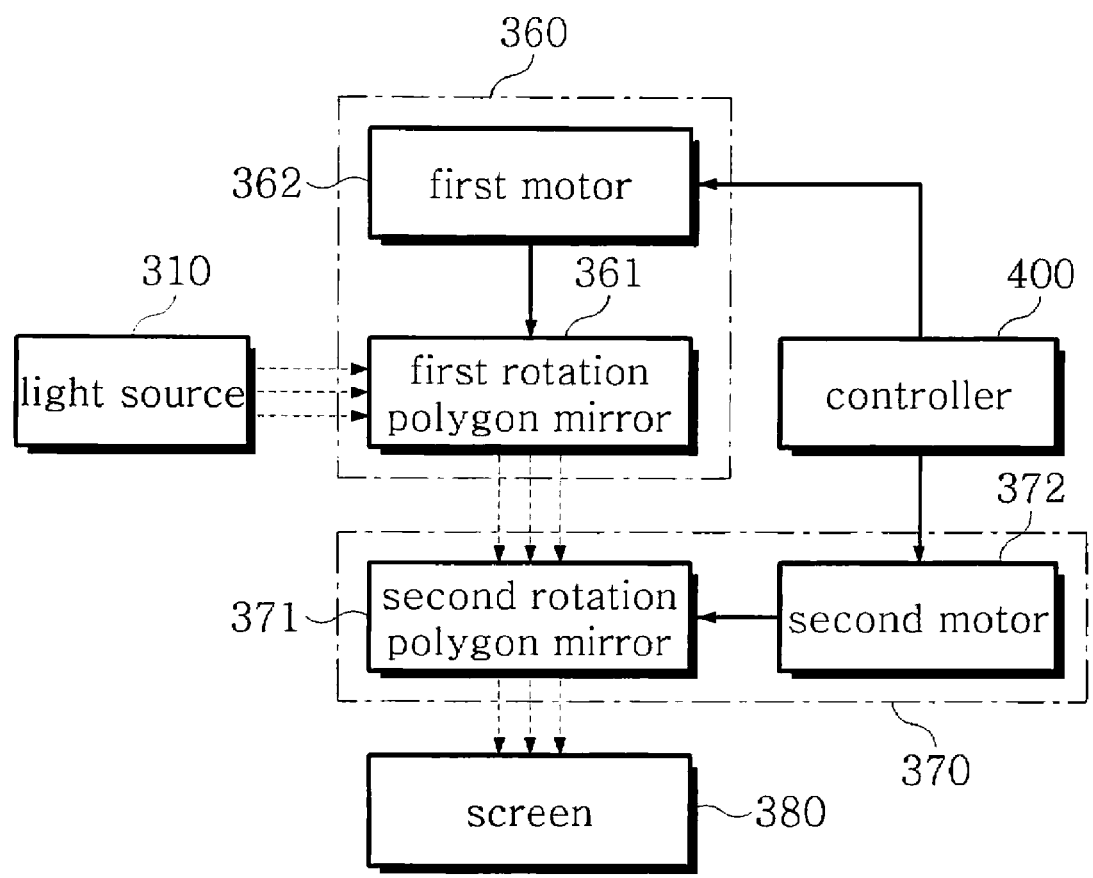
FIG. 18 is a block diagram illustrating an electric circuit of FIG. 17.
Figure 19:
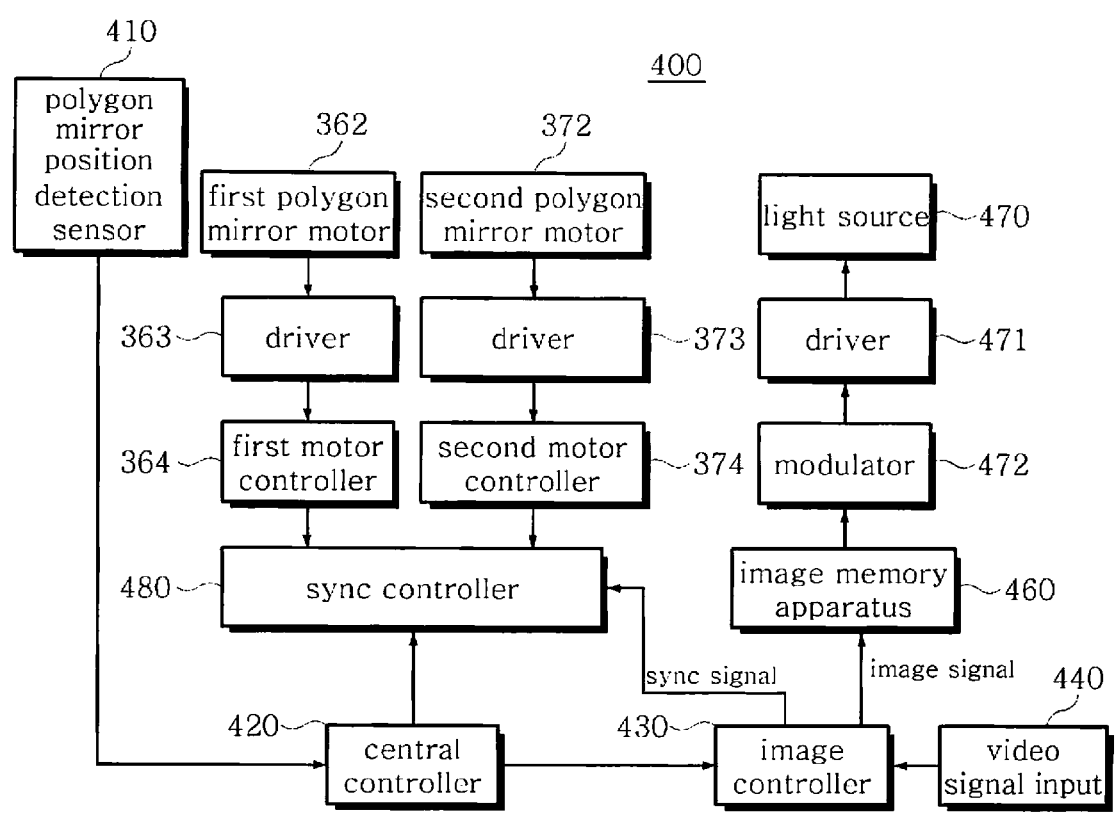
FIG. 19 is a block diagram illustrating a controller of FIG. 18.

FIG. 3 is a block diagram illustrating a schematic construction of a laser display apparatus according to the present invention. FIG. 4 is a plane view illustrating a LED (Light Emitting Diode) device array according to the present invention. FIG. 5 is a perspective view illustrating a construction of a laser display apparatus according to a first embodiment of the present invention. FIG. 6 is a perspective view illustrating a constriction of a laser display apparatus according to a second embodiment of the present invention. FIG. 7 is a perspective view illustrating a constriction of a laser display apparatus according to a third embodiment of the present invention. FIG. 8 is a perspective view illustrating a constriction of a laser display apparatus according to a fourth embodiment of the present invention. FIG. 9 is a perspective view illustrating a constriction of a laser display apparatus according to a fifth embodiment of the present invention. FIG. 10 is a perspective view illustrating a constriction of a laser display apparatus according to a sixth embodiment of the present invention. FIG. 11 is a perspective view illustrating a constriction of a laser display apparatus according to a seventh embodiment of the present invention. FIG. 12 is a perspective view illustrating a constriction of a laser display apparatus according to an eighth embodiment of the present invention. FIG. 13 is block diagram illustrating a schematic construction of a laser display apparatus according to a ninth embodiment of the present invention. FIG. 14 is a perspective view illustrating a construction of a laser display apparatus according to a ninth embodiment of the present invention. FIG. 15 is a block diagram illustrating an electric circuit of FIG. 14. FIG. 16 is a block diagram illustrating a controller of FIG. 15. FIG. 17 is a perspective view illustrating a construction of a laser display apparatus according to a tenth embodiment of the present invention. FIG. 18 is a block diagram illustrating an electric circuit of FIG. 17. FIG. 19 is a block diagram illustrating a controller of FIG. 18.

As shown in FIG. 3, a laser display unit 100, a main controller 200, a screen 140 and a computer 150 are connected with each other. The laser display unit 100 includes a LED device array 101 for emitting laser light in accordance with an image signal which is externally inputted, a collimation lens 110 which collimates laser light from the LED device array 101, a condensing unit 120 which allows laser light to transmit through one imaginary focus, and a scanning unit 130 for reflecting laser light. In addition, the laser light reflected by the scanning unit 130 is projected on the screen 140 so that a user can easily recognize the image from the outside.

The main controller 200 is connected with the laser display unit 100, with the main controller 200 generating a data and a control signal for displaying a certain image on the screen in accordance with an image data inputted from the computer 150.

Here, the main controller 200 includes a communication circuit 210 which receives a certain data such as an image or an advertisement data from the computer, a main controller processor 220 which computes a certain change of a color, brightness and time of a laser diode so as to project an image or an AD content received through the communication circuit 210 on a screen in a form of laser light, a main memory 230 which stores the values computed by the main controller processor 220, an encoder 240 which detects the position and rotation angle of a mirror motor 133 or a rotation motor 136 so as to recognize the position of the rotation polygon mirror 135 or the galvano mirror 132 which will be described later with FIGS. 9 and 10, a motor driver 250 which controls the mirror motor 133 or the rotation motor 136 so that the data with respect to the position and rotation angle of the mirror motor 133 or the rotation motor detected by the encoder 140 and the data transmitted from the main controller processor 220 are projected on a desired portion of the screen, and a laser diode driver 260 which supplies power to the laser diode devices 104 so that the laser diode devices 104 emit a lot of light based on the data transmitted from the main controller processor 220, with the laser diode devices 104 forming the LED device array 100.

FIG. 4 is a view illustrating a construction of the LED device array. As shown therein, the LED device array 101 becomes a light source which generates light and is formed of a rod-shaped very small size laser diode wafer.

The laser wafer 102 is cut with a certain size in a rod shape for thereby forming the LED device array 101. Namely, the laser diode device 104 is cut in a bar shape from the laser wafer 102 in which a plurality of laser diodes 104 are formed in a honeycomb shape.

The LED device array 101 emits color laser light. In the same manner as the conventional art, there are provided lasers which generate and emit red, green and blue wavelength light. The light emitted from each laser are integrated, so that the laser light having the same colors as the images inputted through the LED device array 101 is scanned.

FIG. 5 is a perspective view illustrating a laser display unit 100 according to a first embodiment of the present invention. As shown therein, the LED device array 101 is formed in a very small size laser diode wafer, and a collimation lens 110 is disposed at one side (right side of FIG. 5) of the LED device array 101.

The collimation lens 110 collimates each laser light scanned by the laser diode devices 104 (right direction of FIG. 5) in parallel, with the laser diode devices 104 forming the LED device array 101. The lenses corresponding to the number of the laser diode devices 104 are arranged.

Here, the collimation lens 110 is called as collimate micro lens and is widely used at an apparatus designed to scan laser light. So, the detailed descriptions of the same will be omitted.

A convex lens 122 is coupled at one side of the collimation lens 110. The convex lens 122 allows each laser light to transmit through one imaginary focus, with the laser light being collimated by the collimation lens 110. The convex lens 122 belongs to one embodiment of the condensing unit 120.

As shown in FIG. 5, the light scanned from the laser diode device 104 of the LED device array 101, which is arranged in parallel at upper and lower sides, is converged at one imaginary focus "f". Since the function of the convex lens 122 is well known, the detailed descriptions of the same will be omitted.

A galvano mirror 132 is provided at one side of the convex lens 122 for reflecting laser light which transmits through the convex lens 122. The galvano mirror 132 belongs to the scanning unit 130 and is formed of a small size plane mirror and is rotatable within a certain angle range.

A mirror motor 133 is installed at a lower side of the galvano mirror 132. The mirror motor 133 allows the galvano mirror 132 to reciprocate within a certain distance range. The driving force generated by the mirror motor 133 is transferred to the galvano mirror 132 through a motor shaft 134.

The laser light reflected by the galvano mirror 132 is projected on the screen 140 in a certain size image form.

FIG. 6 is a view illustrating a laser display apparatus according to a second embodiment of the present invention. In this embodiment of the present invention, a rotation polygon mirror 135 is used instead of the galvano mirror 132 which is used in the first embodiment of the present invention of FIG. 5.

In the same manner as the first embodiment of the present invention, the LED device array 101, which emits color laser light, is arranged at the upper and lower sides. A plurality of collimation lenses 110 are arranged at a right side of the LED device 101 for collimating the laser light. A convex lens 122 is provided at a right side of the collimation lens 110 for changing the transmission direction of the laser light, so that laser lights are converged at one imaginary focus "f".

The laser light, which transmits the convex lens 122, is reflected by the rotation polygon mirror 135 and is displayed on the screen 140 as an image. The rotation polygon mirror 135 is formed in a certain size polygon column shape, with the cross section of the same being formed in a regular polygon shape. A scan mirror is formed at an outer surface of each rotation polygon mirror for thereby reflecting laser light inputted. The rotation polygon mirror 135 belongs to the scanning unit 130 together with the galvano mirror 132.

The rotation polygon mirror 135 is installed and is rotatable in one direction. The rotation motor 136 is provided at a lower side of the rotation polygon mirror 135 for thereby generating a rotational force. The driving force generated by the rotation motor 136 is transferred to the rotation polygon mirror 135 through the rotation shaft 137.

The rotation polygon mirror 135 is preferably formed of a plurality of plane mirrors (for example, eight plane mirrors in the case of an octagonal rotation polygon mirror, or sixteen plane mirrors in the case of a 16-angle rotation polygon mirror).

The laser light emitted to the surface of one rotation polygon mirror 135 is reflected by the surface of the same and is transmitted to the screen 140. Since the rotation polygon mirror 135 keeps rotating, the laser light is longitudinally transmitted to the screen 140 in a horizontal direction.

In the case that the cross section of the rotation polygon mirror 135 is octagonal, the laser light is transmitted (angle of vision is 90°) to the screen 140 in the horizontal longitudinal direction at 90° from the light source (namely, focus of laser light transmitted to the rotation polygon mirror). In the case that the cross section of the rotation polygon mirror 135 is 16 angles, the laser light is transmitted to the screen 140 from the light source in the horizontal longitudinal direction at 45° (angle of vision is 45°).

The angle of the cross section of the rotation polygon mirror 135 is determined based on the size of the advertisement board (namely, screen) and the characters, images, etc which will be displayed on the advertisement board. The angles of the vision (maximum horizontal angles when laser light is transmitted from the light source) are generally determined based on the formula "720÷number of angles".

FIGS. 7 and 8 show the third and fourth embodiments of the present invention. In these embodiments of the present invention, a concave mirror 124 is used instead of the convex lens 122 used as the condensing unit 120 of the first and second embodiments of the present invention of FIGS. 5 and 6.

As shown in FIG. 7, the laser light, which transmits through the collimation lens 110, is reflected by the concave mirror 124 and transmits through one imaginary focus "f". The laser light reflected by the concave mirror 124 is reflected again by the galvano mirror 132 and is displayed on the screen 140 as an image.

As shown in FIGS. 7 and 8, the laser light, which transmits the collimation lens 110, is reflected by the concave mirror 124 and transmits through one imaginary focus "f". The laser light reflected by the concave mirror 124 is reflected again by the rotation polygon mirror 135 and is displayed on the screen 140 as an image.

FIGS. 9 and 10 show the fifth and sixth embodiments of the present invention. In the fifth and sixth embodiments of the present invention, a plurality of plane mirrors 127 are used. Namely, a mirror assembly 126 formed of a plurality of plane mirrors 127 is used as an embodiment of the condensing unit 120.

As shown in FIG. 9, the mirror assembly 126 is constituted in such a manner that a plurality of plane mirrors 127 are arranged at one side at certain inclination angles. The very small size plane mirrors 127 corresponding to the size of the laser diode device 104 are arranged at one side at inclination angles for thereby reflecting the laser light scanned by the laser diode device 104.

Here, the inclinations angles of the plane mirrors 127 are preferably different with each other. The plane mirrors 127 are installed at certain inclination angles in one direction so that each laser light reflected by the plane mirror 127 is converged at one imaginary focus "f", and the inclination angles are different with each other.

As shown in FIGS. 9 and 10, in the case that the galvano mirror 132 or the rotation polygon mirror 135, which scans and reflects the laser light reflected by the mirror assembly 126, is installed at a portion lower than the mirror assembly 126, each plane mirror 127 is installed in such a manner that the inclination angles are getting smaller in the downward direction.

In the case that the scanning unit 130 is provided at a portion lower than the mirror assembly 126 which forms the condensing unit 120, the inclination angle $\alpha 1$ of the upper plane mirror 128 formed at the upper side is smaller than the inclination angle $\alpha 2$ of the lower plane mirror 129 formed at the lower side. The inclination angles of the plane mirror 127 is changed in a certain direction, so that the laser light reflected by the condensing unit 120 is converged at one imaginary focus "f" formed at one side of the condensing unit 120.

The operation of the laser display apparatus according to the preferred embodiments of the present invention will be described.

As shown in FIG. 3, a certain image is inputted into the main controller 200 through the computer 150. Namely, an image or advertisement data of the computer 150 is transmitted to the main controller processor 220 through the communication circuit 210. The main controller processor 220 computes the changes of color, brightness or time of the laser diode device 104 so as to project the image or advertisement data transmitted from the main controller processor 220 on the screen using laser light.

The values computed by the main controller processor 220 are stored in the main memory 230 and at the same time are transferred to the laser diode driver 260. The laser diode driver 260 supplies power to the laser diode device 104 so that each laser diode device 104, which forms the LED device array 101, emits enough light based on the data received.

When the power is supplied to the laser diode device 104, the laser diode device 104 scans laser light. The red, green and blue wavelength lights generated by each laser (not shown) are integrated for thereby scanning laser light of color corresponding to the signal inputted.

The laser light scanned by the laser diode device 104 is collimated by the collimation lens 110. The laser light, which transmits in parallel through the collimation lens 110, changes its transmission direction by the condensing unit 120. Namely, the transmission direction is changed by the mirror assembly 126 which is formed of the convex lens 122, the concave mirror 124 or the plane mirrors 127, and each laser light is converged at one imaginary focus "f".

The laser light converged at one imaginary focus "f" is reflected by the scanning unit 130 and is displayed on the screen in an image form. The laser light is reflected by the galvano mirror 132 or the rotation polygon mirror 135 and is displayed on the screen 140 in an image form.

The galvano mirror 132 or the rotation polygon mirror 135 is driven by the mirror motor 133 or the rotation motor 136 provided at the lower side of the same. The mirror driver 250 controls the mirror motor 133 or the rotation motor 136.

The encoder 240 detects the position and rotation angle of the mirror motor 133 or the rotation motor 136 and transfers to the main controller processor 220. The motor driver 250 controls the rotation of the mirror motor 133 or the rotation motor 136 so that the data transferred from the main controller processor 220 is displayed on a certain portion of the screen in an image form.

Since the scanning unit 130 such as the galvano mirror 132 or the rotation polygon mirror 135 keeps rotating, the laser light reflected is scanned in horizontal and longitudinal directions on the screen 140. The horizontal length of the laser light projected on the screen 140 increases more as the screen 140 gets far away from the scanning unit 130. In addition, since the LED device array 101 is longitudinally arranged in the upper and lower sides, the upper and lower lengths of the image projected on the screen 140 increase as the screen 140 gets far away from the scanning unit 130.

The horizontal and vertical lengths of the laser light scanned on the screen 140 increase as the screen 140 gets far away from the scanning unit 130. Even when the position of the screen is slightly changed from the display apparatus, the character, image, etc. displayed on the screen has a constant aspect ratio.

Each laser light of which the transmission direction is changed by the condensing unit 120 has different scanning angles so that a certain focus is formed in an imaginary space, and the scanning unit 130 rotates. Even when the position of the screen 140 gets closer to or gets far away from the scanning unit 130, the laser light scanned in the vertical direction of the screen 140 and the laser light scanned in the horizontal direction of the screen 140 are scanned on the screen 140 with constant angles, so that the aspect ratio of the character or image displayed on the screen 140 are constant even when the position of the screen 140 changes.

FIGS. 10 and 11 shows the seventh and eighth embodiments of the present invention. In these embodiments of the present invention, an f-θ lens 170 is further provided between the scanning unit 130 such as the galvano mirror 132 or the rotation polygon mirror 135 and the screen 140. The f-θ lens 170 allows the laser light reflected by the scanning unit 130 to scan in left and right directions at a constant speed.

Since the screen 140 is formed in a plane shape, each laser light scanned by the laser diode device 104 and reflected by the scanning unit 130 has a constant speed, but the speed of the laser light scanned on the screen 140 in the left and right directions is faster than the speed at the left and right ends as compared to the center portion of the screen. So, the image may be enlarged at the left and right ends in the left and right directions as compared to the center portion, so that the brightness of the images decreases.

The f-θ lens 170 is provided so as to overcome the above problems. With the f-θ lens 170, the left and right movement speeds of the laser light and the speed that the center portion is moved in the left and right direction are compensated, with the laser light being scanned at the left and right end portions of the screen 140. Since the f-θ lens 300 is generally used in the art, the detailed description of the same will be omitted.

The scopes of the present invention are not limited to the above-disclosed embodiments of the present invention. It is obvious that the person who skilled in the art may modify with the basic principles of the present invention.

FIG. 13 is a view illustrating a schematic construction of a laser display apparatus according to another embodiment of the present invention.

As shown therein, the laser display apparatus includes a light source 310 which scans laser light based on an externally inputted image signal, and a scanning unit which reflects laser light scanned by the light source 310 and transmits through one imaginary focus. The scanning unit includes a swing actuator 350 which linearly reflects the laser light scanned by the LED device array, and a first rotation polygon mirror 360 which is installed in a vertical direction with respect to the rotation shaft 340 of the swing actuator 350. The laser light reflected by the scanning unit is canned on the screen 370. The first rotation polygon mirror 360 is fast rotated in the clockwise direction, and the swing actuator 350 swings with respect to the rotation shaft 340.

As shown in FIG. 13, the process that laser light outputted from one laser diode is projected on the screen will be described. One laser light is reflected by the swing actuator 350, and the reflected laser light is reflected again by the first rotation polygon mirror 360 and is projected on the screen 370. Since two scanning units cooperate at different angles, the reflected laser light is fast scanned from the upper most portion to the lower side of the screen 370 for thereby forming an image. As the first rotation polygon mirror 360 rotates, a horizontal scanning operation is performed at the screen 370, and the vertical direction laser scanning operation is fast performed based on the swing operation of the swing actuator 350. The laser light reflected by the scanning unit is projected on the screen 370, so that a user can externally view the image.

In addition, the main controller (not shown) is provided at the laser display apparatus according to the present invention for generating a data and control signal which are used for displaying the image on the screen in accordance with an image data inputted from a computer or another image signal source (not shown).

FIG. 14 is a perspective view of the ninth embodiment of the present invention, and FIG. 15 is a block diagram of an electric circuit of FIG. 14. As shown in FIG. 14, the light source 310 is a laser diode array or a LED array. A plurality of laser lights are collimated by the collimation lens 320. One imaginary focus "f" is formed at a front surface of the swing actuator 350 by a condenser lens 330, and the laser light is reflected by the first rotation polygon mirror 360 and is scanned on the screen 380. The first rotation polygon mirror 360 fast rotates in a clockwise direction, so that a horizontal scanning operation is fast performed on the screen 380. Since the swing operation is performed in the forward and backward directions with respect to the rotation shaft 340 of the swing actuator 350, the laser light scanning operation is fast performed on the screen 380 in the vertical direction.

The collimation lens 320 is called as collimate micro lens. Since the collimation lens 320 is widely used for the apparatus which scans laser light, the detailed descriptions of the same will be omitted.

A condenser lens 330, which is a convex lens, is provided at one side of the collimation lens 320. The condenser lens 330 allows each laser light, which is collimated by the collimation lens 320, to pass through one imaginary focus "f".

The conventional art has a disadvantage that the image is enlarged in the horizontal direction when the screen gets far away from the light source. However, in the present invention, it is possible to always maintain an aspect ratio of the screen irrespective of the distance between the screen and the light source. Since a plurality of light sources are concurrently scanned in the horizontal direction, a flickering phenomenon does not occur, and the horizontal scanning time is extended.

In addition, since the vibration angle of the swing actuator for the vertical scanning operation is only ½ of the angle between the neighboring light sources, it is possible to implement a high resolution screen with small vibrations.

As shown in FIGS. 15 and 16, the first rotation polygon mirror 360 comprises a rotation polygon mirror 361, a first motor 362 which drives the rotation polygon mirror 361 at a high speed, a driver 363, and a first motor controller 364. The swing actuator 350 includes an actuator 351, a driver 352 for driving the actuator 351, and a waveform generator 353. There is provided a controller 400 for controlling a driving state of the first motor 362 and the driver 363. The laser light generated by the light source 310 is reflected at one imaginary focus "f" of the actuator 351, and the laser light reflected by the actuator 351 is inputted into the rotation polygon mirror 361. The laser light is reflected by the mirror surface based on a certain time interval for thereby forming an image on the screen 370.

Here, the rotation polygon mirror 361 is formed of multiple plane mirrors (for example, in the case of an octagonal polygon mirror, eight plane mirrors are adapted, and in the case of a 16-angle rotation polygon mirror, sixteen plane mirrors are adapted). One laser light, which is transmitted to the surface of one rotation polygon mirror 361, is reflected by the surface of the same and is projected on the screen 380. Since the rotation polygon mirror 361 keeps rotating, the laser light is projected on the screen in the horizontal longitudinal direction.

In the case that the cross section of the rotation polygon mirror 361 is rectangular, the laser light is transmitted from the light source 380 in the horizontal longitudinal direction at 90° on the screen through the focus of the laser light projected to the rotation polygon mirror 361 (emission angle is 90°). In the case that the cross section of the rotation polygon mirror 361 is 16 angles, the laser light is transmitted to the screen 380 from the light source in the horizontal longitudinal direction at 45° (emission angle is 45°).

As shown in FIG. 16, the controller 400 for controlling the elements of the apparatus according to the first embodiment of the present invention comprises a central controller 420, an image controller 430, a sync controller 450, and an image memory apparatus 460. The image controller 430 transmits a sync signal to the sync controller 450 and transmits an image signal to the image memory apparatus 460. A video signal is inputted into the image controller 430, and the central controller 420 controls the image controller 430 in accordance with a signal detected by the polygon mirror position detection sensor 410.

The sync controller 450 is connected with the first rotation polygon mirror 360 which includes a first motor 362, a driver 363 and a first motor controller 364 for driving and controlling the first rotation polygon mirror 360 and the swing actuator 350.

The actuator 351, the driver 352 and the waveform generator 353 are connected with the sync controller 450 for driving the swing actuator 350.

A light source 470 such as a LED, a driver 471 and a modulator 472 are connected with the image memory apparatus 460.

FIG. 17 is a perspective view illustrating a construction of a laser display apparatus according to a tenth embodiment of the present invention. FIG. 18 is a block diagram illustrating an electric circuit of FIG. 17. FIG. 19 is a block diagram illustrating a controller of FIG. 18.

As shown in FIG. 17, like the ninth embodiment of the present invention, the light source 310 is a laser diode array. A plurality of laser lights are collimated by the collimation lens 320. One imaginary focus "f" is formed at a front surface of the second rotation polygon mirror 370 by the condenser lens 330. The laser light is reflected by the first rotation polygon mirror 360 and is reflected again by the mirror surface of the first rotation polygon mirror 360 based on the elapse of time and is scanned on the screen 380. Since the first rotation polygon mirror 360 rotates at a high speed in the clockwise direction, the horizontal scanning operation is fast performed on the screen 380. The second rotation polygon mirror 370 rotates in the counterclockwise direction with respect to the center shaft, so that the vertical direction scanning operation is fast performed on the screen 380.

The condenser lens 330 allows each laser light, which is collimated by the collimation 320, to transmit through one imaginary focus "f".

In the present invention, a constant aspect ratio of the screen is always maintained irrespective of the distance between the screen and the light source. Since a plurality of light sources are concurrently scanned in the horizontal direction, a horizontal scanning length is extended, and a flickering phenomenon does not occur at the screen. Since the time required for expressing one pixel is extended, it is possible to express the minimum and maximum brightness of the pixel in multiple steps. Since the second rotation polygon mirror 370 adapted for the vertical scanning operation does not vibrate but rotates, a non-vibration and non-noise system may be achieved.

As shown in FIG. 18, the first rotation polygon mirror 360 comprises a rotation polygon mirror 361, and a first motor 362 for driving the rotation polygon mirror 361 at a high speed. The second rotation polygon mirror 370 includes a rotation polygon mirror 371, and a second motor 372 for driving the same. There is provided a controller 400 for controlling the driving operations of the first and second motors 362 and 372.

The laser light generated by the light source 310 is reflected at one imaginary focus "f" of the rotation polygon mirror 361, and the laser light reflected by the rotation polygon mirror 361 is transmitted into the rotation polygon mirror 371 and is reflected by the mirror surface as the time is passed for thereby forming an image on the screen 380. Here, the number of the angles of the rotation polygon mirrors 361 and 371 is determined based on the size of the advertisement board (namely, screen) and the characters or images displayed on the advertisement board. The angle of vision is generally determined based on the formula "maximum horizontal angle=720°÷number of angles of polygon", with the maximum horizontal angle being designed as an angle that the laser light is projected from the light source.

As shown in FIG. 19, in the tenth embodiment of the present invention, the controller 400 comprises a central controller 420, an image controller 430, a sync controller 450, and an image memory apparatus 460. The image controller 430 transmits a sync signal to the sync controller 450 and transmits a video signal to the image memory apparatus 460. A video signal is inputted into the image controller 430, and the central controller 420 controls the image controller 430 in accordance with a signal detected by the polygon mirror position detection sensor 410.

The sync controller 450 is connected with the first rotation polygon mirror 360 which includes a first motor 362, a driver 363 and a first motor controller 364 for driving and controlling the first rotation polygon mirror 360 and the second rotation polygon mirror 370. The sync controller 450 is connected with the second motor 372, the driver 373 and the second motor controller 374 for driving the second rotation polygon mirror 370.

A light source 470 such as a LED, a driver 471 and a modulator 472 are connected with the image memory apparatus 460.

As described above, in the present invention, since the LED device array is formed of a very small laser diode wafer or a chip in a rod shape, a very small laser display apparatus can be manufactured. A small apparatus such as a cellular phone or a wristwatch may be integrated with a very small laser display apparatus having a condensing unit according to the present invention.

In the present invention, each laser light transmitted from a plurality of laser diode devices is converged at one imaginary focus, with the laser diode devices being arranged in a longitudinal shape, and the laser light is reflected by the scanning unit, so that an image is displayed on the screen. So, a constant aspect ratio of the image displayed on the screen can be obtained irrespective of the distance between the screen and the apparatus of the present invention.

In addition, in the present invention, when a f-θ lens is disposed between the scanning unit and the screen, since the moving speed of the laser light scanned at the left and right ends and center portion of the screen in the left and right directions is constant, a quality image can be obtained on the screen. In the present invention, it is possible to prevent the image displayed at the left and right ends of the screen from being elongated or the brightness of the image from becoming poor.

The resolution of the display apparatus can be enhanced, and a constant resolution may be obtained. A constant aspect ratio of the image displayed on the screen can be obtained irrespective of the distance between the screen and the apparatus of the present invention.

In particular, in the present invention, it is possible to achieve an optimum focus image irrespective of the position of the screen since the lights generated by each light source can transmit in parallel without being dimmed as compared to the conventional art in which it is needed to adjust the focus of the image by operating the projection lens whenever the distance between the screen and the apparatus changes in the conventional projection image system.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A laser display apparatus which forms an image at a screen by scanning a laser light, comprising:
    a light emitting diode (LED) device array comprising a plurality of laser diode devices arranged in a straight shape configured to scan a laser diode in accordance with an image signal inputted, with the laser diode devices being designed to generate laser light;
    a collimation lens, provided at one side of the LED device array, configured to collimate each laser light scanned from the laser diode devices in parallel in one direction;
    a condensing means, provided at one side of the collimation lens, configured to allow each laser light, collimated by the collimation lens, to transmit through one imaginary focus, wherein said condensing means is formed of a plurality of plane minors corresponding to laser lights collimated in a straight direction by the collimation lens, and said plane minors are installed so that each laser light is converged at one imaginary focus; and
    a scanning means configured to reflect each of the laser light which transmits via the condensing means, wherein each of the laser light is reflected from the one imaginary focus so as to form the image on the screen,
    wherein the one imaginary focus is located on a point on a reflecting surface of the scanning means,
    wherein each of said plane mirrors is arranged at one side at predetermined inclination angles and corresponds to a laser diode device of the laser diode device array, and
    wherein said plane mirror reflects the laser light scanned by the laser diode device.

2. The apparatus of claim 1, further comprising:
    a first rotation polygon mirror which linearly reflects laser light scanned from the LED device array;
    a swing actuator which is installed in a vertical direction with respect to a rotation shaft of the first rotation polygon mirror; and
    a controller which synchronically controls the first rotation polygon mirror and the swing actuator.

3. The apparatus of claim 2, wherein said controller is formed of a central controller, an image controller and a sync controller, and said central controller inputs a signal detected by a polygon mirror position detection sensor into the sync controller and the image controller, respectively, and said image controller receives a video signal and transmits a sync signal to the sync controller and transmits a video signal to the video memory apparatus, and said sync controller receives a control signal of the first rotation polygon mirror and a control signal of the swing actuator for thereby implementing a sync control operation. with the first rotation polygon mirror being formed of a polygon mirror motor, a driver and a motor controller, and with the swing actuator being formed of an actuator, a driver and a waveform generator.

4. The apparatus of claim 1, wherein said scanning means of the laser display apparatus, comprising:
    a first rotation polygon mirror which linearly reflects laser light scanned from the LED device array;
    a second rotation polygon mirror which is installed in a vertical direction with respect to a rotation shaft of the first rotation polygon mirror; and
    a controller which synchronically controls the first rotation polygon mirror and the second rotation polygon mirror.

5. The apparatus of claim 4, wherein said controller is formed of a central controller, an image controller and a sync controller, and said central controller inputs a signal detected by a polygon mirror position detection sensor into the sync controller and the image controller, respectively, and said image controller receives a video signal and transmits a sync signal to the sync controller and transmits a video signal to the video memory apparatus, and said sync controller receives a control signal of the first rotation polygon mirror and a control signal of the second rotation polygon mirror for thereby implementing a sync control operation. with the first rotation polygon mirror being formed of a polygon mirror motor, a driver and a motor controller, and with the second rotation polygon mirror being formed of a second motor, a driver and a second motor controller.

6. The laser display apparatus of claim 1, wherein the plurality of plane mirrors are arranged so as to form a concave mirror.

* * * * *